US012576536B2

(12) United States Patent
Trombone et al.

(10) Patent No.: US 12,576,536 B2
(45) Date of Patent: Mar. 17, 2026

(54) ROBOTIC WITH DEPTH FINDING CAPABILITY AND METHOD OF USING

(71) Applicant: Gov of the US as rep by the Secy of the Air Force, Wright Patterson AFB, OH (US)

(72) Inventors: Daniel Trombone, North Las Vegas, NV (US); Matthew Ruben, Las Vegas, NV (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 247 days.

(21) Appl. No.: 18/342,983

(22) Filed: Jun. 28, 2023

(65) Prior Publication Data

US 2025/0001617 A1 Jan. 2, 2025

(51) Int. Cl.
B25J 11/00 (2006.01)
B25J 9/16 (2006.01)
(Continued)

(52) U.S. Cl.
CPC ........... B25J 11/0025 (2013.01); B25J 9/162 (2013.01); B25J 13/006 (2013.01); B25J 13/088 (2013.01); B25J 15/08 (2013.01); B25J 19/023 (2013.01)

(58) Field of Classification Search
CPC .... B25J 11/0025; B25J 13/006; B25J 13/088; B25J 15/08; B25J 19/023; B25J 9/162; B25J 5/005; B25J 9/1612; B25J 9/1697; G05B 2219/40155; G05B 2219/40195; G05B 2219/40298
See application file for complete search history.

(56) References Cited

U.S. PATENT DOCUMENTS

| | | | |
|---|---|---|---|
| 5,219,264 | A | 6/1993 | McClure |
| 6,113,343 | A | 9/2000 | Goldenberg |

(Continued)

OTHER PUBLICATIONS

B. Day, C. Bethel, R. Murphy and J. Burke, "A Depth Sensing Display for Bomb Disposal Robots," 2008 IEEE International Workshop on Safety, Security and Rescue Robotics, Sendai, Japan, 2008, pp. 146-151, doi: 10.1109/SSRR.2008.4745892. (Year: 2008).*

(Continued)

*Primary Examiner* — Adam R Mott
*Assistant Examiner* — James Miller Watts, III
(74) *Attorney, Agent, or Firm* — AFMCLO/JAZ; Larry L. Huston

(57) ABSTRACT

A robot for disposal of hazardous ordnance, such as IEDs. The robot has a pair of opposed grippers extending outwardly in the longitudinal direction to respective distal ends. The grippers are mutually openable and closable to grasp the ordnance. As the grippers open and close they automatically move aft and fore, respectively. The robot has a single camera but no depth vision in the longitudinal direction. A sensor is mounted on the opposed grippers to determine the separation distance between the sensors as they open and close in real time. The lateral separation distance is automatically converted a to a longitudinal distance from the ordnance by the relationship between the lateral separation distances and the longitudinal advance of the grippers upon closing.

20 Claims, 7 Drawing Sheets

(51) Int. Cl.

| | |
|---|---|
| *B25J 13/00* | (2006.01) |
| *B25J 13/08* | (2006.01) |
| *B25J 15/08* | (2006.01) |
| *B25J 19/02* | (2006.01) |

(56) References Cited

U.S. PATENT DOCUMENTS

| | | | | |
|---|---|---|---|---|
| 8,306,663 | B2 | 11/2012 | Wickham | |
| 9,508,148 | B2 | 11/2016 | Zhang | |
| 9,969,087 | B1 | 5/2018 | Blankespoor | |
| 11,383,380 | B2 | 7/2022 | Bradski | |
| 2003/0151266 | A1* | 8/2003 | Moilanen | B25J 15/0226 |
| | | | | 294/203 |
| 2012/0286533 | A1* | 11/2012 | Mettler | B25J 19/023 |
| | | | | 294/213 |
| 2013/0268118 | A1* | 10/2013 | Grinstead | G05D 1/0022 |
| | | | | 700/259 |
| 2017/0144314 | A1 | 5/2017 | Min | |

OTHER PUBLICATIONS

R. Primerano, A. Pietrocola and M. Janko, "A snake-like robot incorporating translational and rotation degrees of freedom," 2013 IEEE/RSJ International Conference on Intelligent Robots and Systems, Tokyo, Japan, 2013 (Year: 2013).*

Cairo—âPosition Analysis.â Cairo University Scholars, Mar. 2, 2015, web.archive.org/web/20250509202104/https://scholar.cu.edu.eg/?q=anis/files/week04-mdp206-position_analysis-draft.pdf. (Year: 2015).*

Anonymous. âOptimized Trigonometric Functions on TI Arm Coresâ Texas Instruments, Aug. 2022, www.ti.com/lit/an/sprad27a/sprad27a.pdf?ts=1664676324461. (Year: 2022).*

Jiang et al., Hand-Eye Calibration of EOD Robot by Solving the AXB D YCZD Problem, Digital Object Identifier, 0.1109/ACCESS.2021.3136850, IEEE Access, Dec. 20, 2021, p. 3429.

Kirkpatrick et al., Robotically applied hemostatic clamping for care-under-fire: harnessing bomb robots for hemorrhage control, Can J Surg Apr. 1, 2022; 65(2). doi: 10.1503/cjs.009920,, Apr. 7, 2021, p. E242.

Day et al., A Depth Sensing Display for Bomb Disposal Robots, 978-1-4244-2032-2/08, Proceedings of the 2008 IEEE International Workshop on Safety, Security and Rescue Robotics, Sendai, Japan, Oct. 2008, p. 146.

Molfino et al., AirEOD, The Industrial Robot; 2006; 33, 3; ProQues, Industrial Robot: An International Journal 33/3 (2006), p. 228.

Trombone [First named inventor], Final Report ET450: Capstone Project, University of Arkansas Grantham with Prof. Mo Hajibeigy, p. 1.

* cited by examiner

| Separation Distance SD | Fore/Aft Distance F/A |
|---|---|
| 34.4 | 12 |
| 33.3 | 13.7 |
| 32 | 15.35 |
| 31.4 | 17.2 |
| 28.9 | 19 |
| 27.7 | 20 |
| 26.4 | 20.75 |
| 25.2 | 21 |
| 24.15 | 21.55 |
| 22.9 | 22 |
| 22.1 | 22.45 |
| 20.9 | 23 |
| 19.8 | 23.45 |
| 18.95 | 23.55 |
| 17.9 | 23.8 |
| 16.9 | 24.05 |
| 15.85 | 24.2 |
| 14.85 | 24.5 |
| 14.05 | 24.8 |
| 13 | 24.9 |
| 11.9 | 25.1 |
| 10.85 | 25.1 |
| 9.8 | 25.15 |
| 8.75 | 25.15 |
| 7.8 | 25.2 |
| 6.9 | 25.2 |
| 6.5 | 25.3 |

ROBOTIC WITH DEPTH FINDING CAPABILITY AND METHOD OF USING

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to a robot having opposed grippers for manipulating an ordnance to be disarmed and more particularly to such a robot having grippers which simultaneously move in the longitudinal direction while opening and closing according to a knowable and predetermined relationship.

BACKGROUND OF THE INVENTION

The most important tool for a bomb squad during improvised explosive device (IED) operations is the robot. The robot is necessary for safety and particularly provides for remote operation by an operator. However, there has been a serious problem with depth perception since bomb squad technicians began using robots to interrogate devices. Picking up an object is specifically the most challenging task of all operations. For decades, technicians have sought to enhance spatial awareness. One attempt was to triangulate distance from an item by utilizing multiple camera positions. However, many situations do not allow for different viewpoints when the robot is working in tight spaces, and thus only a single camera may be available.

In another attempt the operator watches the shadow cast by the robot grippers on the surface below. But this attempt is severely limited to environments that have ideal lighting. Yet another attempt involves taping zip ties to the ends of the grippers. The zip-ties act as feeler-antennas, providing a visual cue for the operator to know when the grippers are nearing an item under consideration. Unfortunately, this method involves directly touching the explosive ordnance which is not always permissible.

Precision is everything for bomb technicians because there is no margin for error. It is critical that they solve as many problems as possible with their robots before directly exposing themselves to danger. However, navigating a 3D environment with a 2D camera is difficult. Even experienced technicians can find it to be impossible to pick up objects with the grippers with this limitation.

Military, EOD (Explosive Ordnance Disposal) and other first responders worldwide rely on the Remotec ANDROS F6A robots available from Northrup Grumman of Falls Church, VA for various EOD in hazardous duty missions. More than 1200 ANDROS F6A robots are estimated to be in use worldwide, spanning at least 20 years of service.

The ANDROS F6A robots are typical of the art and have a single forward extending arm. Two opposed grippers are mounted on corresponding four bar mechanisms at the end of the forward arm. The grippers are mounted on the floating bar of the four bar mechanism and move towards and away from each other to grasp and release ordnance in response to commands from an operator. The operator uses the arm and grippers to move the ordnance to a safe location, to disassemble the ordnance and otherwise engage in disposal of the ordnance as needed for the mission.

Actual and suspected ordnance may be a great distance away from the operator or obscured by debris, walls, etc. and is often not directly seen by the operator. EOD robots, such as the ANDROS F6A, rely upon a camera for the operator to visually ascertain information regarding ordnance which cannot be directly seen by the operator.

However the ANDROS F6A robot, and similar robots, may have only a single camera available during a mission. Secondary cameras may be obscured by debris, damaged, covered with dust or otherwise unavailable, leaving only a single camera for the mission. But a single camera cannot provide depth perception. An operator using a single camera robot may attempt to grasp a suspicious article, but have difficulty determining proper position of the grippers for further steps. Improper positioning can lead to detonation and other safety hazards. The absence of depth perception increases both the time and danger of the mission.

Adding additional cameras, for stereoscopic depth vision is expensive, unavailable for certain robots and may void the warranty of other robots. Adding permanent hardware to the EOD robot would also likely void the warranty and may interfere with proper operation.

Accordingly, there is a long felt need to provide depth perception to EOD robots without adding stereoscopic cameras or other permanent hardware. There is further a need to have a simple retrofit to the hundreds of existing EOD robots of various types and sizes and to reliably provide depth perception for the wide variety of ordnance encountered in the unlimited hazardous situations encountered during EOD operations. It is an object of this invention to address these longstanding needs.

SUMMARY OF THE INVENTION

In one embodiment the invention comprises a robot for disposal of IEDs and being manipulable by a remote operator. The robot has a longitudinal axis defining a longitudinal direction and a lateral direction orthogonal thereto, the robot comprises a body, a tread operably associated with the body and suitable for locomotion of the robot across the ground responsive to mechanical input from a motor, and a pair of opposed grippers extending outwardly of the body to respective distal ends spaced longitudinally forward thereof. The grippers are mutually openable and closable in the lateral direction responsive to commands from an operator and thereby dynamically define a separation distance therebetween, the opposed grippers further having a lateral sensor thereon to determine the separation distance, whereby opening and closing of the grippers automatically sends a signal to a remote operator indicating a longitudinal distance between the body and the respective distal ends of the grippers.

In another embodiment the invention comprises a pair of mutually opposed grippers mounted to a body of a robot, the robot having a microcontroller, the mutually opposed grippers being symmetrically opposite about a longitudinal axis defining a longitudinal direction and a lateral direction orthogonal thereto. The grippers are openable and closable in response to commands from an operator and comprise respective proximal ends joined to the robot body and corresponding distal ends remote therefrom, a lateral sensor disposed on a first sensor and oriented in the lateral direction, a reflector disposed on a second sensor and positioned to reflect a signal from the lateral sensor back to the lateral sensor. The opposed grippers move fore and aft in the longitudinal direction responsive to an operator closing and opening the opposed grippers.

A sensor determines a lateral separation distance between the grippers, the separation distance being determinative of a longitudinal distance between the body and the distal ends of the grippers and having a known relationship associated with the mutually opposed grippers for converting the lateral separation distance to the longitudinal distance.

In another embodiment the invention comprises a method of manipulating an ordnance or other object, the method comprising the steps of providing a robot having a body, a tread operably associated with the body and suitable for locomotion of the robot across the ground responsive to mechanical input from a motor and a pair of mutually opposed grippers extending outwardly of the body to respective distal ends spaced longitudinally forward thereof, the grippers being mutually openable and closable in the lateral direction responsive to commands from an operator and thereby dynamically defining a separation distance therebetween, the opposed grippers having a lateral sensor thereon to determine the separation distance, providing a first indicium discernable by an operator and indicating to the operator the longitudinal distance from the distal ends of the opposed grippers to a front edge of the ordnance or other object, advancing the robot towards and into proximity of an ordnance or other object to be manipulated, extending the mutually opposed grippers towards the ordnance or other object until a first predetermined distance therefrom is reached and alerting the operator via the first indicium that the first predetermined distance has been reached.

Figure 5:
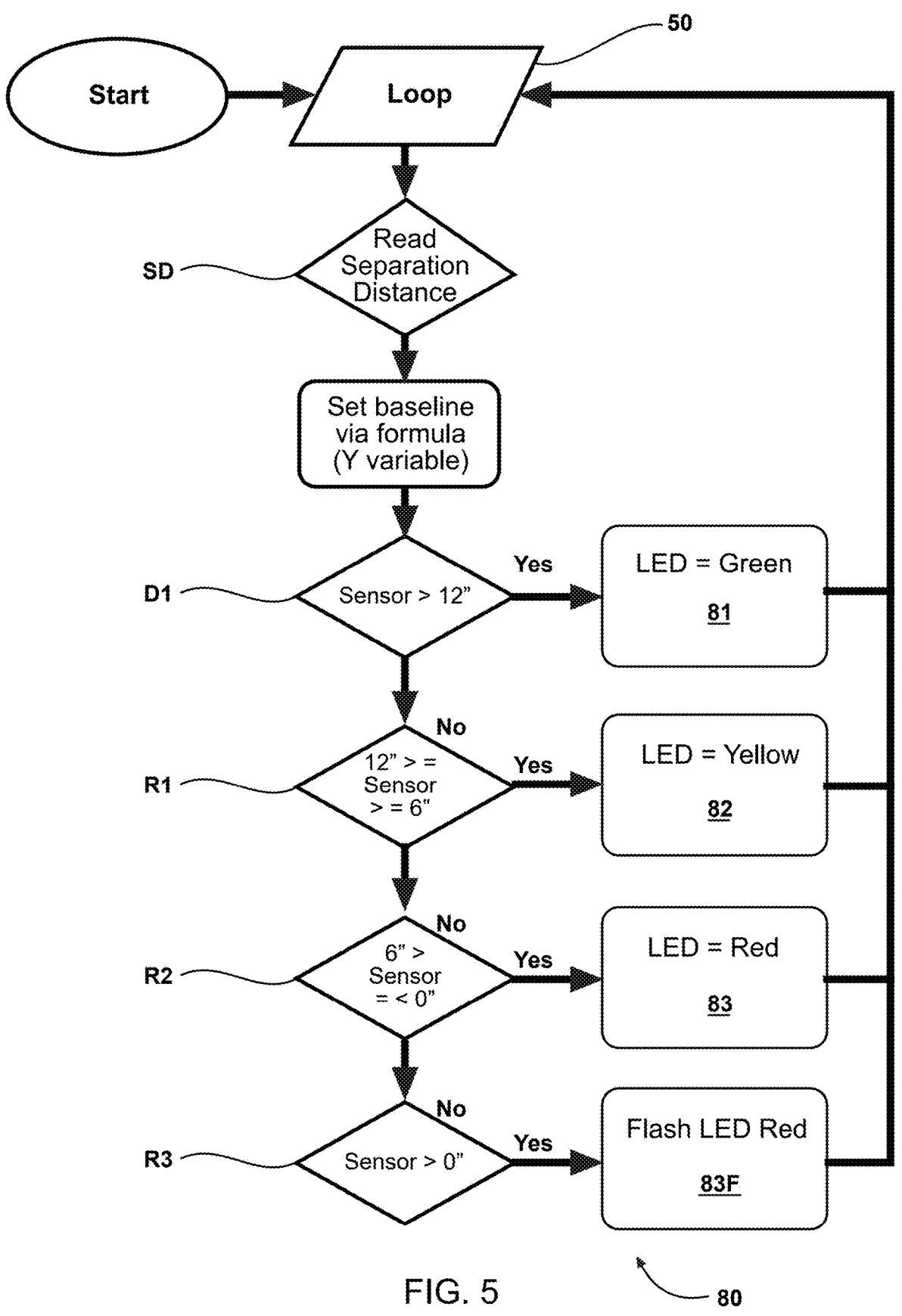
FIG. 5 is a circuit diagram of an exemplary indicia circuit.
Figures 5A, 5B, 5C:
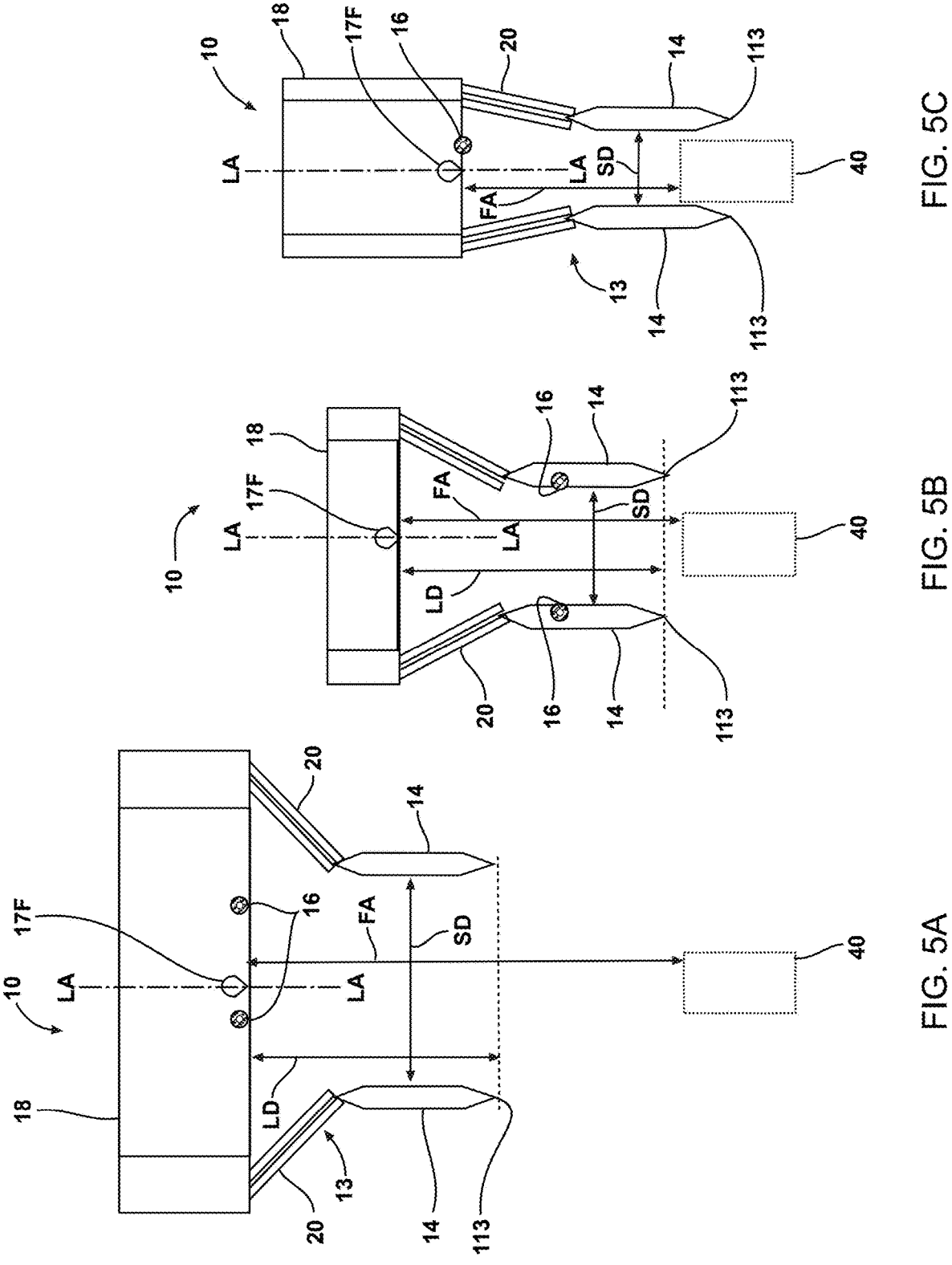
FIG. 5A is a schematic top plan view a robot having the grippers retracted from an ordnance shown in phantom.
FIG. 5B is a schematic top plan view the robot of FIG. 5A having the grippers approaching an object shown in phantom.
FIG. 5C is a schematic top plan view the robot of FIG. 5A having the grippers intercepting an object shown in phantom.

The indicia of the robots of FIGS. 5A, 5B and 5C are intentionally shown in different positions. The sizes of the robot bodies of FIGS. 5A, 5B and 5C are intentionally differently sized for fit.

FIG. 6 is a lookup table of the empirical relationship between the separation distance between the grippers and the longitudinal distance between the fore/aft sensor in centimeters and the distal end of the gripper fingers in centimeters.

Figure 7:
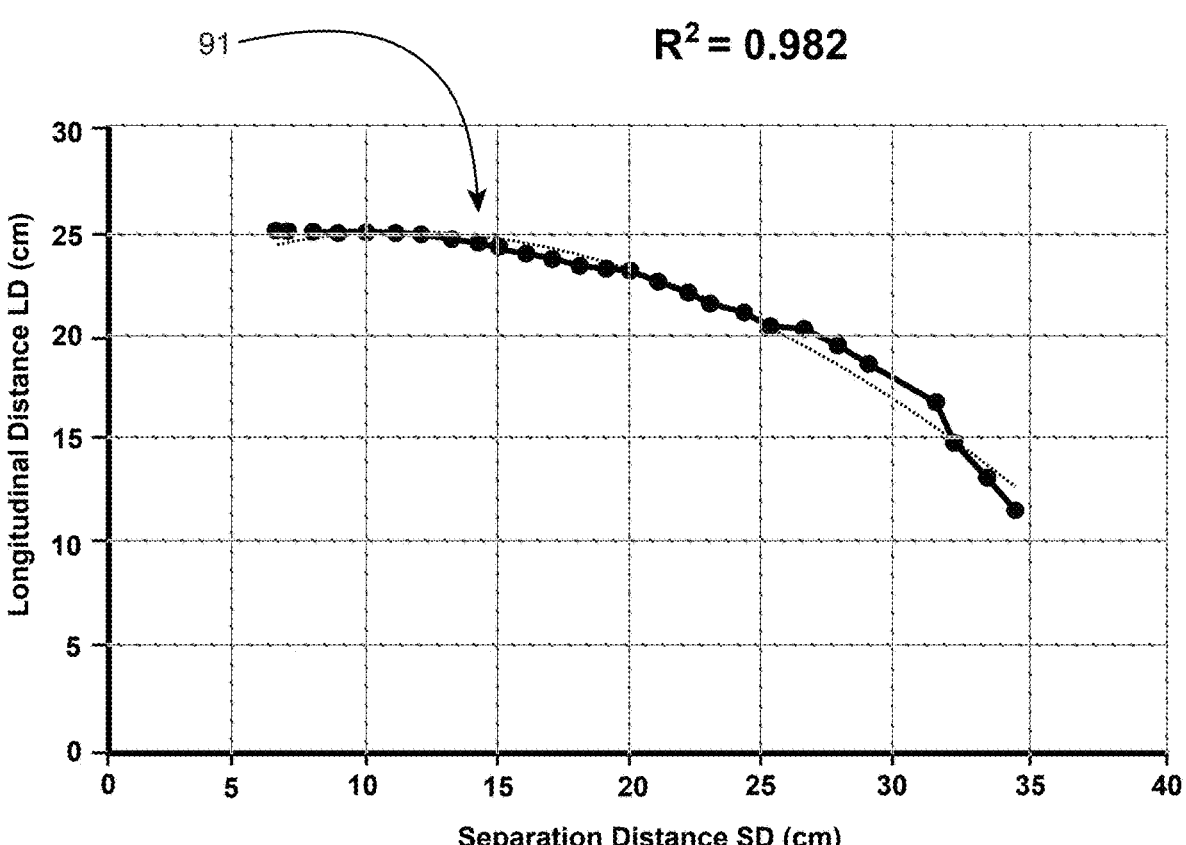

FIG. 7 is a graphical relationship of the separation distance between the grippers and the distance from the fore/aft sensor to the distal end of the gripper fingers, based upon the lookup table in FIG. 6.

DETAILED DESCRIPTION OF THE INVENTION

Figure 1:
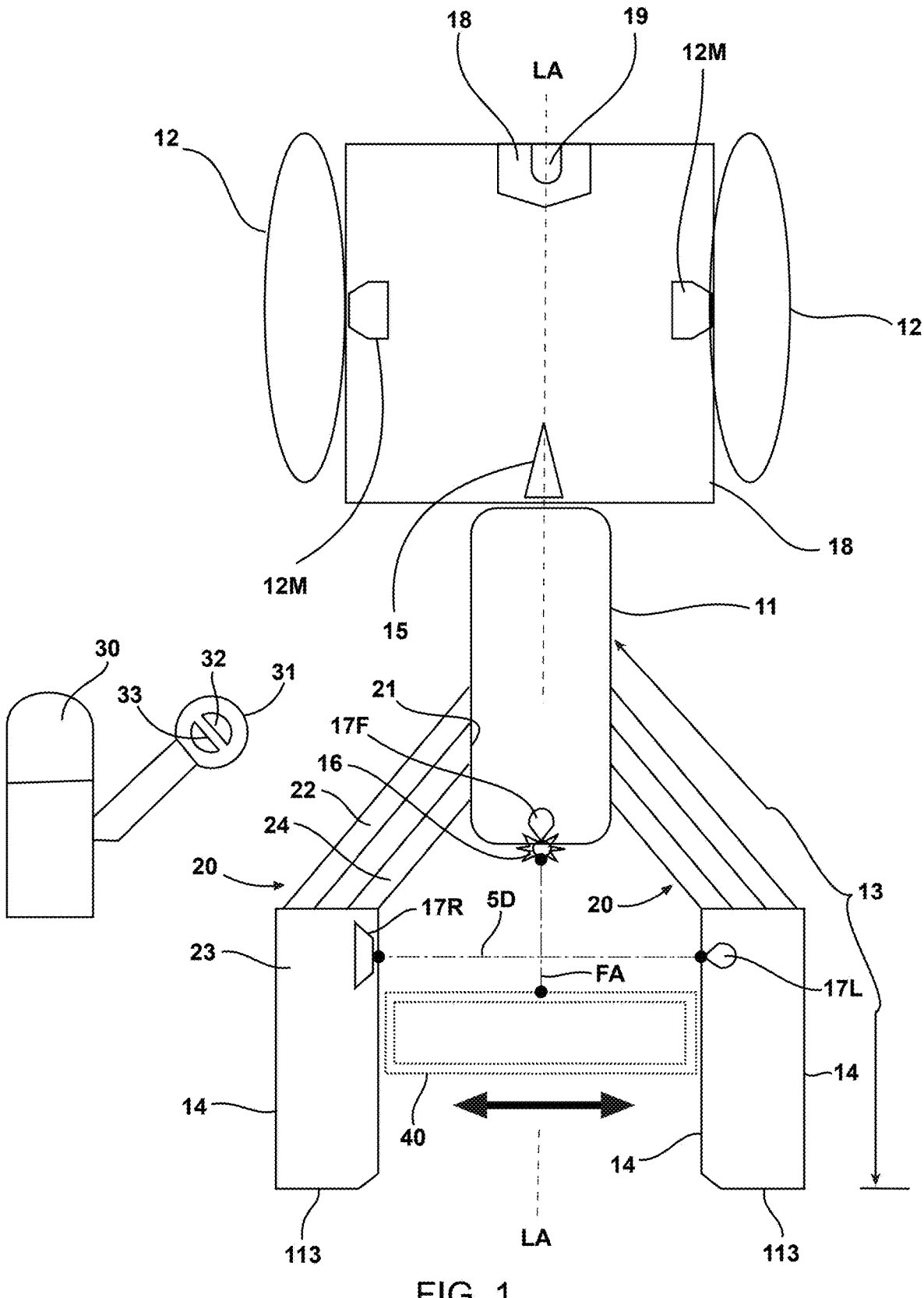
FIG. 1 is a schematic top plan view of an operator and a robot according to the present invention, with an object shown in phantom and dashed connecting the lateral sensor to a reflector and dashed connecting the fore/aft sensor and object.

Referring to FIG. 1, a robot 10 according to the present invention comprises a body 18 which functions as a chassis, tread 12 or wheels, an optional forward extending arm 11, opposed grippers 13, lateral and fore/aft sensors 17L, 17F, a camera 15 and optional indicia 16. An operator 30 is remote from the robot 10 for safety. The operator 30 communicates with the robot 10 through wired or wireless transceivers 19 using a controller 31 as is known in the art. The controller 31 has at least a screen 32 for two dimensional viewing of scenes from the camera 15 and has controls for the operator 30 to manipulate the robot 10 as needed for the mission. While portions of the following discussion may refer to ordnance 40, one of skill will recognize the invention is not so limited and other objects 40 may be used with the present invention where ordnance 40 is listed.

The robot 10 may be symmetric about longitudinal axis LA which defines the longitudinal direction and is parallel to a horizontal support surface when the robot 10 is disposed thereon. The longitudinal direction also defines fore/aft directions forward of and rearward of the robot 10, respectively whereby the arm 11 extends outward primarily in the forward direction. The body 18 contains one or more microcontrollers 18, motors, transceivers 19 and/or other components necessary for proper and convenient operation of the robot 10. The transceiver 19 and microcontroller 18 may be integrated as a single unit or separate. The treads 12 or wheels (herein collectively referred to as treads 12) provide for locomotion over the ground and various terrains where missions are to be carried out. The camera 15 is native forward looking although may have several degrees of rotation about either or both of the horizontal and vertical axes. The camera 15 may have visible, IR and other spectrum detection capability. The robot 10 will typically have only a single camera 15 available, although the invention is not so limited. The forward arm 11 provides support for the mutually opposed grippers 13. The forward arm 11 may have up to five axis mobility for positioning of the grippers 13 as needed. The arm 11 is optional for connecting the grippers 13 to the body 18, and the grippers 13 may be joined directly to the body 18 for simplicity with the tradeoff of having less mobility for the grippers 13.

The lateral sensor 17L may utilize visible light, IR radiation, a rotary encoder, etc., as are known in the art. The grippers 13 may comprise four bar mechanisms 20, articulating arms, rack and pinion systems, etc., as are known in the art. The grippers 13 of the present invention may advantageously be used with a first robot 10 as needed for a particular mission, then retrofitted to different robots 10 as needed for subsequent missions.

Each gripper 13 may comprise a four bar mechanism 20. The fixed bar 21 is joined to the arm 11 and may be juxtaposed with the distal end of the arm 11. The fixed bar 21 provides the proximal end of the gripper 13. Two links, particularly an input bar 22 and output bar 24, articulably extend outwardly from the fixed bar 21 and are articulably connected at a floating bar 23. The input bar 22 controls movement of the four bar mechanism 20 responsive to commands from a remote operator 30. The input bar 22 may be operated by a dedicated motor or driven in known manner by the motors 12M which drive the treads 12.

The floating bar 23 carries the opposed fingers 14 which contact, carry and otherwise manipulate the ordnance or other object 40 under consideration. The fingers 14 may define the distal end of the gripper. As used herein the longitudinal distance LD is the variable distance between the fixed fore/aft sensor 17F and the distal end of the gripper 13 [it being understood that if the grippers 13 are asymmetric the invention should be calibrated for the gripper 13 having the forwardmost distal end].

The fingers 14 move towards the longitudinal axis LA in the closing direction and away from the longitudinal axis LA in the opening direction. Advantageously, the fingers 14 may move towards and away from each other in the closing and opening directions [as shown by the arrows], respectively, upon a single command from the operator 30 for simplicity of operation. While the grippers 13 are shown as being symmetrically opposite, one of skill will recognize the invention is not so limited.

The optional indicium(ia) 16 may be used to alert the operator 30 to the relative or absolute potion of the fingers 14. The indicium 16 may comprise steady/intermittent audible signals, haptic feedback to the operator 30 and preferably visible lights such as LEDs 81, 82, 83. The lights may be visible to the operator 30 through the camera 15.

A lateral sensor 17L may be disposed on the floating bar 23 of a first gripper 13 with a reflector 17R on the second gripper 13. The lateral sensor 17L detects absolute distance therebetween in the lateral direction, herein referred to as the separation distance SD. The separation direction SD is perpendicular to the longitudinal direction and also parallel to a horizontal support surface. The lateral sensor 17L provides both relative and absolute lateral distances between the opposed grippers 13. If the interior faces of the grippers 13 are irregular, the separation distance SD is taken at the closest position between the grippers 13, as this would be the portion of the interior face which first contacts the ordnance or other object 40.

According to the present invention the separation distance SD is advantageously converted to depth perception in the longitudinal direction. This depth perception enables the operator 30 to know in real time whether the grippers 13, and particularly the fingers 14 thereof, are longitudinally, have incipient overlap or have longitudinally intercepted the ordnance 40. Yet another advantage of the present invention is that closing of the finger 14 and forward direction can occur automatically and simultaneously upon a single command from the operator 30, simplifying operations without distracting the operator.

The robot 10 preferably also has a fore/aft sensor 17F for determining absolute position relative to and distance from the ordnance 40. The fore/aft sensor 17F is preferably mounted on the body 18 of the robot 10 for simplicity and to avoid extraneous motion which would occur of the fore/aft sensor 17F was mounted on one of the grippers 13. The fore/aft sensor 17F operates by reflection from the surface of the ordnance 40. The fore/aft sensor 17F and lateral sensor 17L may be mutually identical for simplicity or different to tailor the properties to the expected distances for the mission. While the fore/aft sensor 17F and lateral sensor 17L are shown to be parallel and perpendicular to the longitudinal axis, respectively, one of skill will recognize other geometries are feasible as well.

Figure 2:
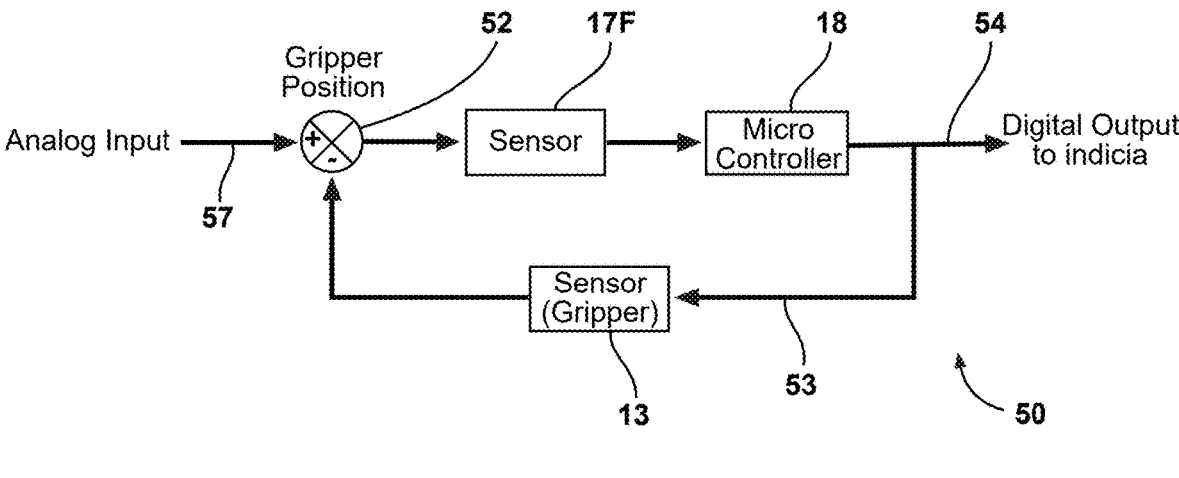
FIG. 2 is an exemplary process control diagram for the present invention.

Referring to FIG. 2, the robot 10 according to the present invention may operate on a control loop 50. In the control loop 50 a reference voltage 51 is input to a summer 52. The summer 52 determines the difference between the reference voltage 51 and the voltage from the grippers 13, based upon gripper 13 position to determine an actuating signal. This actuating signal is sent to a fore/aft sensor 17F, which, in turn sends a manipulated variable to a microcontroller 18. The microcontroller 18, in turn, sends an output signal 54 to the appropriate indicium 16 to alert the operator 30 to the fore/aft position of the fingers 14. The output signal 54 is then dynamically summed with the reference voltage 51 in the feedback loop 53.

Figure 3:
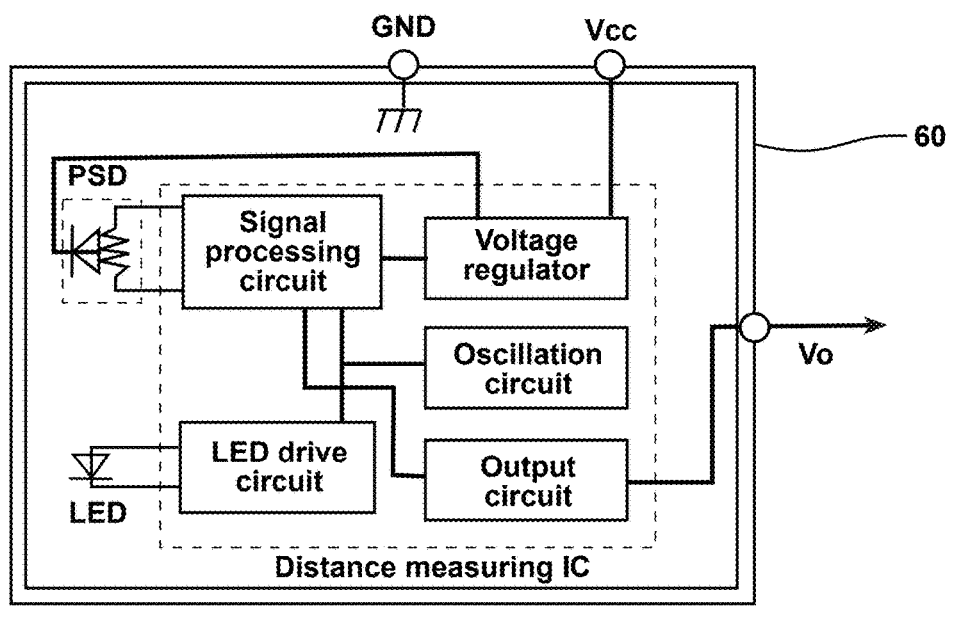
FIG. 3 is a circuit diagram of an exemplary IC chip for measuring separation distance.

Referring to FIG. 3, in an exemplary circuit 60, preferably the fore/aft sensor 17F and lateral sensor 17L have: a range of at least 10 cm to 80 cm and preferably 0 to 100 cm; a supply voltage of −0.3V to +7V; at output voltage of −0.3V to +0.3V; an operating voltage of 4.5 V to 5.5V with a supply current of 30 mA; a sampling sate of at least 20 Hz and preferably at least 26 Hz and an output voltage of at least 1.65V to 2.15 V. An IR GP2YOA21YKOF fore/aft sensor 17F and lateral sensor 17L available from Sharp Corporation of Osaka, Japan has been found suitable for the ANDROS F6A robot 10.

Figure 4:
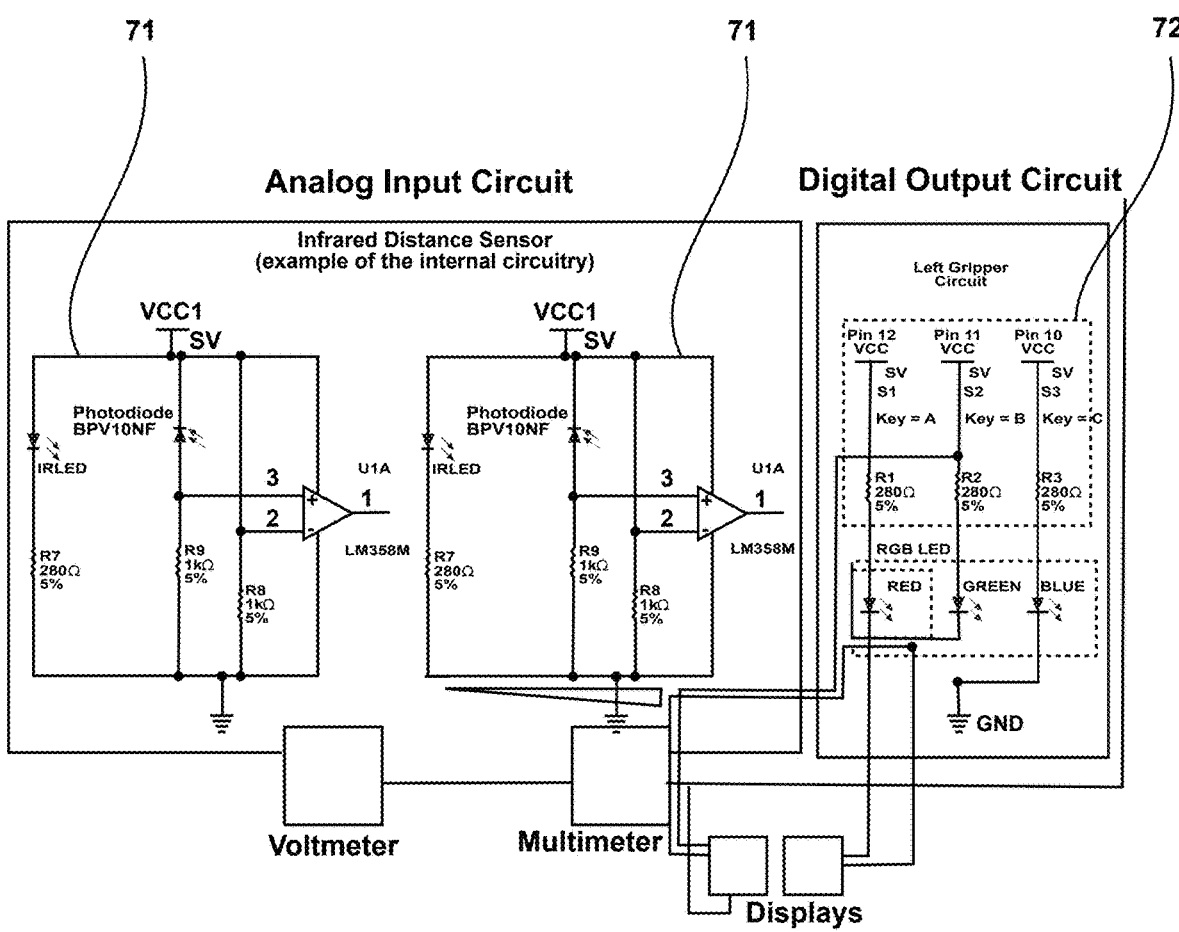
FIG. 4 is a flow chart of an exemplary distance detection circuit.

Referring to FIG. 4, a distance detection circuit 70 may utilize the reference voltage 51 as input to the Vcc pin on the aforementioned fore/aft sensor 17F and lateral sensor 17L. The output voltage from the fore/aft sensor 17F and lateral sensor 17L may be fed to a microcontroller 18. The distance detection circuit 70 may use an analog input as supplied by the fore/aft sensor 17F and lateral sensor 17L. The distance detection circuit 70 may have two internal subcircuits 71, one each for the fore/aft sensor 17F and lateral sensor 17L which send the signal to the digital output circuit 72.

A single chip 8-bit AVR RISC-based CPU having 32 KB flash memory, 1 KB EEPROM and 2 KB SRAM may be used. An ATMega328P microcontroller 18 available from Arduino of Turin, Italy has been found suitable.

The microcontroller 18 onboard voltage regulator and/or the fore/aft sensor 17F and lateral sensor 17L may regulate the current. Power is applied to the fore/aft sensor 17F and lateral sensor 17L integrated circuit, and ultimately an IR beam will be transmitted and then received by an internal phototransistor. Variation in the separation distance SD is determined by the Vout pin, which is connected to the analog input pin on the Arduino microcontroller 18. A bypass capacitor greater than 10 μF is preferably applied across the Vcc terminal and ground terminal to stabilize voltage measurements. The data from fore/aft sensor 17F and lateral sensor 17L are input to the microcontroller 18 for analysis. The Arduino IDE v 2.0.3 coding can be used for control.

Referring to FIG. 5, an indicia 16 circuit 80 having a plurality of LEDS 81, 82, 83 may be used to provide indicia 16 to the operator 30. The indicia 16 circuit 80 may read the separation distance SD in a first step. The separation distance SD is independent of the fore/aft distance FA from the fore/aft sensor 17F to the front edge of the ordnance 40. By subtracting the longitudinal distance LD from the fore/aft distance FA the distance between the distal ends 113 of the grippers 13 and front edge of the ordnance 40 can be determined. An RGB LED 81, 82, 83 may mounted in clear view of the camera 15 so the operator 30 can easily visually ascertain the LED 81, 82, 83 illumination in real time.

Referring to FIG. 5A, a green LED 81 may be used to indicate the distal ends of the fingers 14 are more than a predetermined distance range D1, e.g. 12 inches (30.5 cm) from the front edge of the ordnance 40. Referring to FIG. 5B, a yellow LED 82 may be used to indicate the distal ends of the fingers 14 are within a predetermined range R1 of the longitudinal distance LD, e.g. 6 inches (15.2 cm) to 12 inches (30.5 cm), of the front edge of the ordnance 40. A red LED 83 may be used to indicate the distal ends of the fingers 14 are within a smaller predetermined range R2 of the longitudinal distance LD, e.g. 0 inches to 6 inches (15.2 cm), of the front edge of the ordnance 40 or, e.g. are at incipience. Referring to FIG. 5C, a flashing red (or any other color) LED 83F may be used to indicate the distal ends of the fingers 14 have intercepted the fore/aft position R3 of the ordnance 40. Depending upon resolution, the plural indicia LEDs 81, 82, 83 may indicate qualitative or quantitative positioning of the distal ends 113 of the grippers 13 with respect to the ordnance 40.

The digital output pins from the fore/aft sensor 17F may be used to drive the colors of the RGB LEDs 81, 82, 83 by going HIGH and/or LOW at specified times. The indicia 16 circuit 80 may use a 280 ohm resistor in series with LED leg to limit the current less than 20 mA. This indicia 16 circuit 80 may be a standalone circuit 80 powered by a dedicated 9V battery. Advantageously, the present invention automatically activates the indicia LEDs 81, 82, 83 based upon the separation distance SD between the fingers 14 of the grippers 13 and/or the fore/aft position of the fingers 14 of the grippers 13.

Of course, one of skill will recognize the indicia 16 are not limited to visible lights. Other suitable indicia 16 include audible alarms as may emanate from the controller 31 and are heard by the operator 30. The audible indica may include alarms of various decibel levels, pitches, pulse widths and combinations thereof as the grippers 13 advance towards or retract from the ordnance 40. Other suitable indicia 16 include haptic or tactile vibrations at the controller 31. The vibrations may increase in intensity, frequency, pulse width and combinations thereof as the grippers 13 advance towards or retract from the ordnance 40. Various combinations of visual, audible and haptic indicia 16 are also contemplated.

It is to be understood the indicia 16 may be mounted forward of the camera 15 and observed by the operator 30 on the screen 32 of the controller 31. Alternatively or additionally the indicia 16 may be directly mounted on the controller 31.

Referring to FIG. 6, the separation distances SD between the opposed grippers 13 were measured at various positions from an initial separation distance SD of 34.3 cm. to a closing separation distance SD of 6.5 cm for an ANDROS F6A robot 10. These separation distances SD were tabulated in a lookup table 90. Prophetically different lateral sensors 17L would allow resolution to a lesser (closer) separation distance SD. The corresponding longitudinal distance LD from the fore/aft sensor 17F to the distal ends 113 of the fingers 14 varied as a second order function from 12 cm. to 25.3 cm. It can be seen that there is a fixed and consistent relationship between the separation distance SD and longitudinal distance LD for the particular four bar mechanism 20 under consideration with the ANDROS F6A robot 10. This particular four bar mechanism 20 operates according to a second order relationship between the separation distance SD and the longitudinal distance LD.

Thus according to the present invention, as the operator 30 opens and closes the opposed grippers 13 the longitudinal distance LD is knowable and determinable from either or both of the data points in the lookup table and/or the relationship between the separation distance SD and the longitudinal distance LD. As the dynamic relationship of the separation distance SD changes responsive to opening and closing of the grippers 13, a signal is sent to the operator 30 in real time indicating the corresponding longitudinal distance LD.

While the invention has been described in terms of a robot 10 manipulating, disarming and disposing IEDs 40, the invention is not so limited. The robot 10 of the present invention may be used for handling other objects of interest as well, it being understood such objects and ordnance 40 form no part of the claimed invention. Other objects of interest may include hazardous materials, radioactive contamination, etc.

Referring to FIG. 7, the lookup table 90 of FIG. 6 can be fit to a second order curve 91 using the Excel Trendline function. The data in the lookup table of FIG. 6 can be expressed as: $Y=0.0216 \ X \exp 2+0.4703 \ X+22.657$, wherein X is the separation distance SD and Y is the longitudinal distance LD with a curve fit of $R \exp 2=0.982$. This equation can be programmed into the microcontroller 18. Thus as the operator 30 closes the grips using the controls 33 of the controller 31, the longitudinal distance LD to the ordnance 40 is automatically and accurately known in real time without additional steps required by the operator 30.

Thus the present invention not only provides for depth perception, the present invention further provides live quantitative data to the operator as to both the fore/aft and lateral separation distance SD of the distal ends 113 of the grippers 13.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range of that same parameter. That is the upper limit of one range may be used with the lower limit of another range for the same parameter, and vice versa. As used herein, when two components are joined or connected the components may be interchangeably contiguously joined together or connected with an intervening element therebetween. A component joined to the distal end of another component may be juxtaposed with or joined at the distal end thereof. While particular embodiments of the present invention have been illustrated and described, it would be obvious to those skilled in the art that various other changes and modifications can be made without departing from the spirit and scope of the invention and that various embodiments described herein may be used in any combination or combinations. It is therefore intended the appended claims cover all such changes and modifications that are within the scope of this invention.

What is claimed is:

1. A robot for disposal of hazardous ordnance and being manipulable by a remote operator, the robot having a longitudinal axis defining a longitudinal direction and a lateral direction orthogonal thereto, the robot comprising:
    a body;
    the body being configured for locomotion of the robot across the ground responsive to mechanical input from a motor;
    and a pair of opposed grippers extending outwardly of the body to respective distal ends spaced longitudinally forward thereof, the grippers being mutually openable and closable in the lateral direction responsive to commands from an operator and thereby dynamically defining a separation distance therebetween, the opposed grippers having a lateral sensor thereon to determine the separation distance;

whereby opening or closing the grippers automatically sends a first signal from the robot to a remote operator indicating a longitudinal distance between the body and the respective distal ends of the grippers;

wherein the longitudinal distance is determined based on a known relationship between the separation distance and the longitudinal distance.

2. A robot according to claim 1 further comprising a fore/aft sensor mounted on the body and suitable for determining a fore/aft distance from the fore/aft sensor to an object of interest forward of the body.

3. A robot according to claim 2 further comprising an indicium to the operator to indicate the distal ends of the opposed grippers are within a predetermined distance from the object of interest.

4. A robot according to claim 3 further comprising a plurality of indicia transmitted from the robot to the operator to indicate the distal ends of the opposed grippers are within a like plurality of predetermined distances from the object of interest.

5. A robot according to claim 4 wherein a first indicium indicates the distal ends of the grippers are a first predetermined distance from the object of interest and a second indicium indicates the distal ends of the grippers have intercepted the fore/aft position of the object of interest.

6. A robot according to claim 5 capable of simultaneous locomotion on the ground, opening and closing of the opposed grippers and qualitatively indicating the longitudinal position of the grippers relative to an object of interest.

7. A robot according to claim 2 further comprising a forward camera and wherein the signal sent to the remote operator is received by a controller having a screen for viewing images from the forward camera and wherein the signal sent to the remote operator is received by a controller having a screen for viewing images from the forward camera and the indicium from the signal is discernable by the operator responsive to opening and closing of the opposed grippers.

8. A robot according to claim 7 wherein the indicium from the signal is discernable by the operator in real time responsive to opening and closing of the opposed grippers.

9. A pair of mutually opposed grippers mounted to a body of a robot, the robot having a microcontroller for controlling the mutually opposed grippers, the mutually opposed grippers being symmetrically opposite about a longitudinal axis defining a longitudinal direction and a lateral direction orthogonal thereto, the grippers being openable and closable in response to commands from an operator and comprising:

respective proximal ends joined to the robot body and corresponding distal ends remote therefrom;

a lateral sensor disposed on at least one gripper and configured to quantitatively determine a lateral separation distance between the mutually opposed grippers;

the opposed grippers moving fore and aft in the longitudinal direction responsive to an operator closing and opening the opposed grippers;

whereby the sensor determines a first lateral separation distance between the grippers, the separation distance being determinative of a first longitudinal distance between the body and the distal ends of the grippers;

and a known relationship associated with the mutually opposed grippers for converting the lateral separation distance to the longitudinal distance; wherein the microcontroller determines the longitudinal distance from the known relationship and transmits an indicium of the longitudinal distance to a remote operator.

10. A pair of mutually opposed grippers according to claim 9 wherein continued opening or continued closing of the grippers automatically sends a second signal to the remote operator indicating a second longitudinal distance between the body and the respective distal ends of the grippers, the first signal and the second signal being mutually independent.

11. A pair of mutually opposed grippers according to claim 9 wherein each opposed grippers comprises a four bar mechanism having a fixed bar joined to the body, an input bar and an output bar articulably joined to the bar at respective proximal ends thereof and extending outwardly therefrom to respective distal ends thereof, the input bar and output bar being articulably connected at a floating bar, the floating bar determining the lateral separation distance from an opposing floating bar.

12. A pair of mutually opposed grippers according to claim 11 wherein each floating bar of each gripper further comprises a longitudinally forward extending finger adapted to pick up and move explosive ordnance.

13. A pair of mutually opposed grippers according to claim 11 wherein the known relationship for converting the lateral separation distance to the longitudinal distance is taken from a lookup table.

14. A pair of mutually opposed grippers according to claim 11 wherein the known relationship for converting the lateral separation distance to the longitudinal distance is a second order curve.

15. A pair of mutually opposed grippers according to claim 9 which are symmetrically opposite relative to the longitudinal axis.

16. A pair of mutually opposed grippers according to claim 15 mounted to a multi-axis arm, the multi-axis arm being joined to the body of the robot.

17. A method of manipulating an ordnance, the method comprising the steps of:

providing a robot having a body, a tread operably associated with the body and suitable for locomotion of the robot across the ground responsive to mechanical input from a motor and a pair of mutually opposed grippers extending outwardly of the body to respective distal ends spaced longitudinally forward thereof, the grippers being mutually openable and closable in the lateral direction responsive to commands from an operator and thereby dynamically defining a separation distance therebetween, the opposed grippers having a lateral sensor thereon to determine the separation distance;

whereby opening or closing the grippers automatically sends a first signal from the robot to a remote operator indicating a first longitudinal distance between the body and the respective distal ends of the grippers, wherein the first longitudinal distance is determined based on a known relationship between the separation distance and the first longitudinal distance;

providing a first indicium discernable by an operator and quantitatively indicating to the operator a second longitudinal distance from the distal ends of the opposed grippers to a front edge of the ordnance;

advancing the robot towards and into proximity of an ordnance to be manipulated;

extending the mutually opposed grippers towards the ordnance until a first predetermined distance therefrom is reached;

and alerting the operator via the first indicium that the first predetermined distance has been reached.

18. A method according to claim 17 further comprising the steps of providing plural indicia and alerting the operator via a plurality of indicia that the mutually opposed grippers have reached a predetermined range from the ordnance that is less than the first predetermined distance.

19. A method according to claim 18 further comprising the step of providing a controller for sending commands to the robot by an operator being remote from the ordnance.

20. A method according to claim 19 further comprising the step of providing a camera on the robot for viewing the ordnance and a screen on the controller whereby the operator can observe movement of the grippers on the screen in real time as the grippers are opened and closed.

\*   \*   \*   \*   \*